Dec. 18, 1923.                                                                       1,477,727
                            E. C. STENBERG
                             STEERING WHEEL
                           Filed Dec. 19, 1921
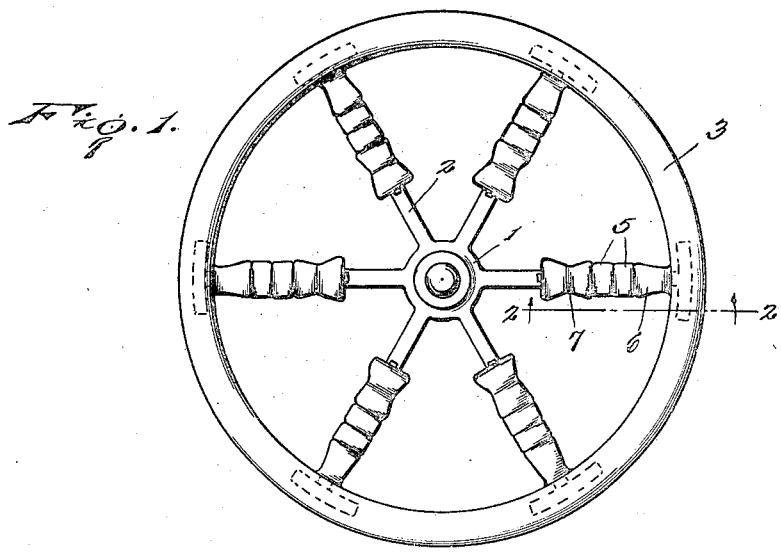
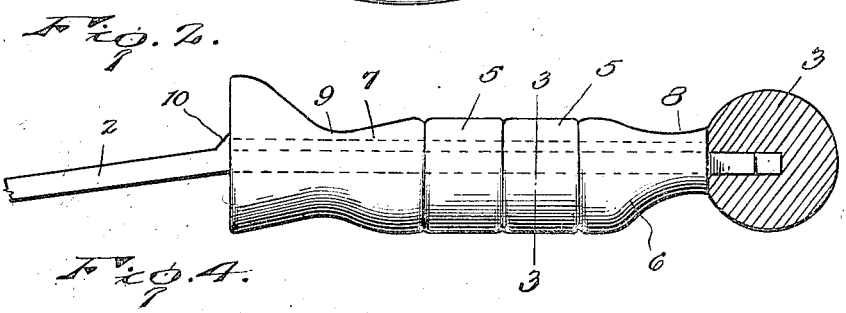
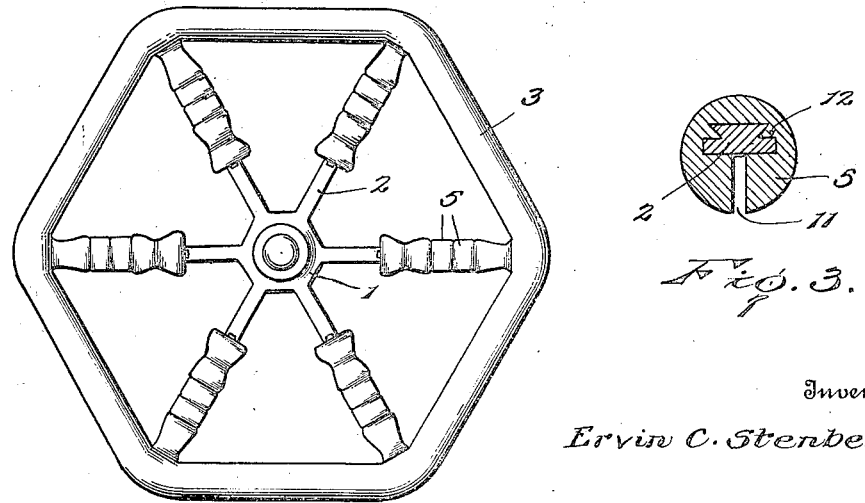
Inventor
Ervin C. Stenberg.
By
Lacy & Lacy, Attorneys Patented Dec. 18, 1923.

1,477,727

UNITED STATES PATENT OFFICE.

ERVIN C. STENBERG, OF DENVER, COLORADO.

STEERING WHEEL.

Application filed December 19, 1921. Serial No. 523,473.

*To all whom it may concern:*

Be it known that I, ERVIN C. STENBERG, a citizen of the United States, residing at Denver, in the county of Denver and State of Colorado, have invented certain new and useful Improvements in Steering Wheels, of which the following is a specification.

This invention relates to steering wheels and has for its object the provision of means whereby the user of a steering wheel will be enabled to grip the same for a considerable period of time without fatigue. The invention seeks to provide a steering wheel so constructed that the steersman, when gripping the wheel, will be enabled to maintain his hand, wrist, and arms in a natural position and strain upon the muscles will be thereby minimized. The invention is illustrated in the accompanying drawings and will be hereinafter fully set forth.

In the drawings—

Figure 1 is a plan view of a steering wheel embodying my improvements;

Fig. 2 is an enlarged section on the line 2—2 of Fig. 1;

Fig. 3 is a detail section on the line 3—3 of Fig. 2;

Fig. 4 is a plan view showing another form of the wheel.

The wheel comprises a hub member 1 which may be given any desired configuration and will be secured upon and to the steering column of an automobile in the usual manner. Details in the outline of the hub will be made to correspond to the particular steering column upon which the wheel is to be mounted. From the hub, a plurality of spokes 2 radiates and the outer ends of the spokes are preferably connected by a rim 3 which is circular in Fig. 1, but in Fig. 4 is hexagonal. It will be noted that I have shown six spokes in the illustrated embodiments of the invention, but the particular number of spokes may be varied at will, although either five or six spokes will be found to give the best results inasmuch as the handle members will thereby be brought into a position in which they may be grasped by the user in a more comfortable manner. The outer extremity of each spoke is secured to the rim and the spoke may be given any desired cross section, although the outer end portions of the spokes are preferably given an angular outline in order that they will engage the handle members so as to prevent twisting of the latter. The handle members or grips may each be a single integral element or may comprise a plurality of units fitted end to end upon the outer end portions of the spokes, and all the units may be of the circular formation shown at 5, if so desired. I prefer, however, to employ one or two circular units 5 at the center of the handle member and have the end members 6 and 7 of the irregular outline shown so that they will readily conform to the bent fingers of the user and permit him to obtain a firm grip upon the handle and spoke without fatigue and without liability of his hand slipping along the spoke. The end members 6 and 7 are approximately of the same diameter as the intermediate members 5 at their inner ends which abut the said inner members and the outer member 6 is reduced toward its outer end, as shown at 8, while the inner end member 7 is reduced between its ends, as shown at 9, and has its inner end flat so as to abut a stop 10 upon the spoke whereby the several units will be held against endwise movement between said stop and the rim 3. These units may be of any desired or preferred material and may advantageously be of rubber or semi-elastic material, being provided in their under sides with a slot or split portion 11 whereby they may be spread and slipped around the end portions of the spoke and being further constructed with a longitudinal dovetail bore, indicated at 12, conforming to the cross sectional outline of the spoke. By this construction, twisting of the gripping units upon the spoke is positively prevented.

It will be readily noted that while the handle members or units are prevented from twisting about the spokes they may be readily removed and interchanged so that a grip conforming to the wishes of any particular customer may be provided. The grips, of course, may be applied to steering wheels now in use, and may have any desired outline in their bores so as to fit snugly upon and about the spoke. Of course, if so desired, the gripping members may be permanently united with the spokes. Steering wheels of motor-vehicles as now very generally constructed consist of a circular rim and four spokes or spindles carrying said rim, the rim forming the primary steering medium or handle. The rim does not furnish a gripping surface which will prevent slipping of the hands and, moreover, the arm, wrist and hand are caused to assume a more or less unnatural position in gripping the rim of the wheel so that the muscles and tendons of the hands and forearms are strained and fatigue and discomfort results. Following the fatigue and discomfort, the operator does not have as effective control of the steering gear as is desirable and serious accidents frequently ensue. My arrangement overcomes all these disadvantages and, moreover, permits the operator to obtain a greater leverage in turning the wheel. The inner end of the grip is also flared toward the hub of the wheel so that it presents an annular enlargement which resists any tendency of the hand to slip inwardly off the grip toward the hub.

Having thus described my invention, what is claimed as new is:

1. A steering wheel comprising a hub, a plurality of radial spokes, a plurality of gripping members fitted upon the outer end portions of the spokes, and stops on the spokes abutting and restraining the said gripping members.

2. A steering wheel comprising a hub, a plurality of radial spokes having their outer end portions of angular cross section, a plurality of abutting gripping units fitted upon the said end portions of the spokes and having bores of the same cross section as the spokes, and stops abutting the ends of said units whereby to prevent endwise movement of the same.

3. A steering wheel comprising a hub, a plurality of radial spokes, grips of cushioning material fitted upon the outer end portions of the spokes and each consisting of a plurality of units arranged end to end longitudinally of a spoke, the outer unit being tapered toward the outer extremity of the spoke and the innermost unit being flared toward the hub, and stops on the spokes abutting the end units and restraining endwise movement of the grips.

In testimony whereof I affix my signature.

ERVIN C. STENBERG. [L. S.]